Oct. 7, 1958  F. P. STARK  2,854,892
REAR VIEW MIRROR FOR TRACTOR AND TRAILER
COMBINATION TYPE OF MOTOR TRUCK
Filed Sept. 26, 1955  4 Sheets-Sheet 1

INVENTOR.
Frank P. Stark
BY
ATTORNEYS

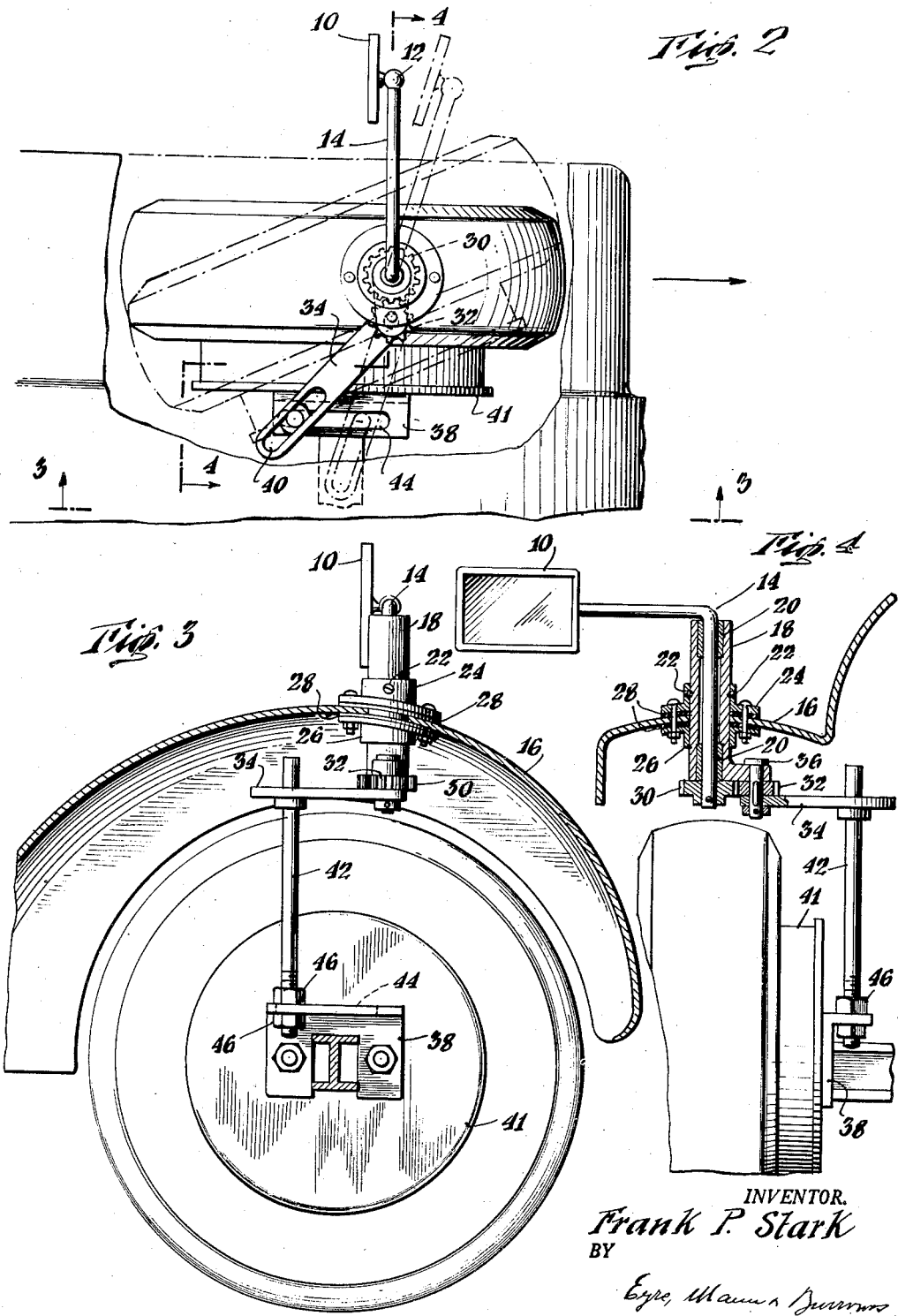

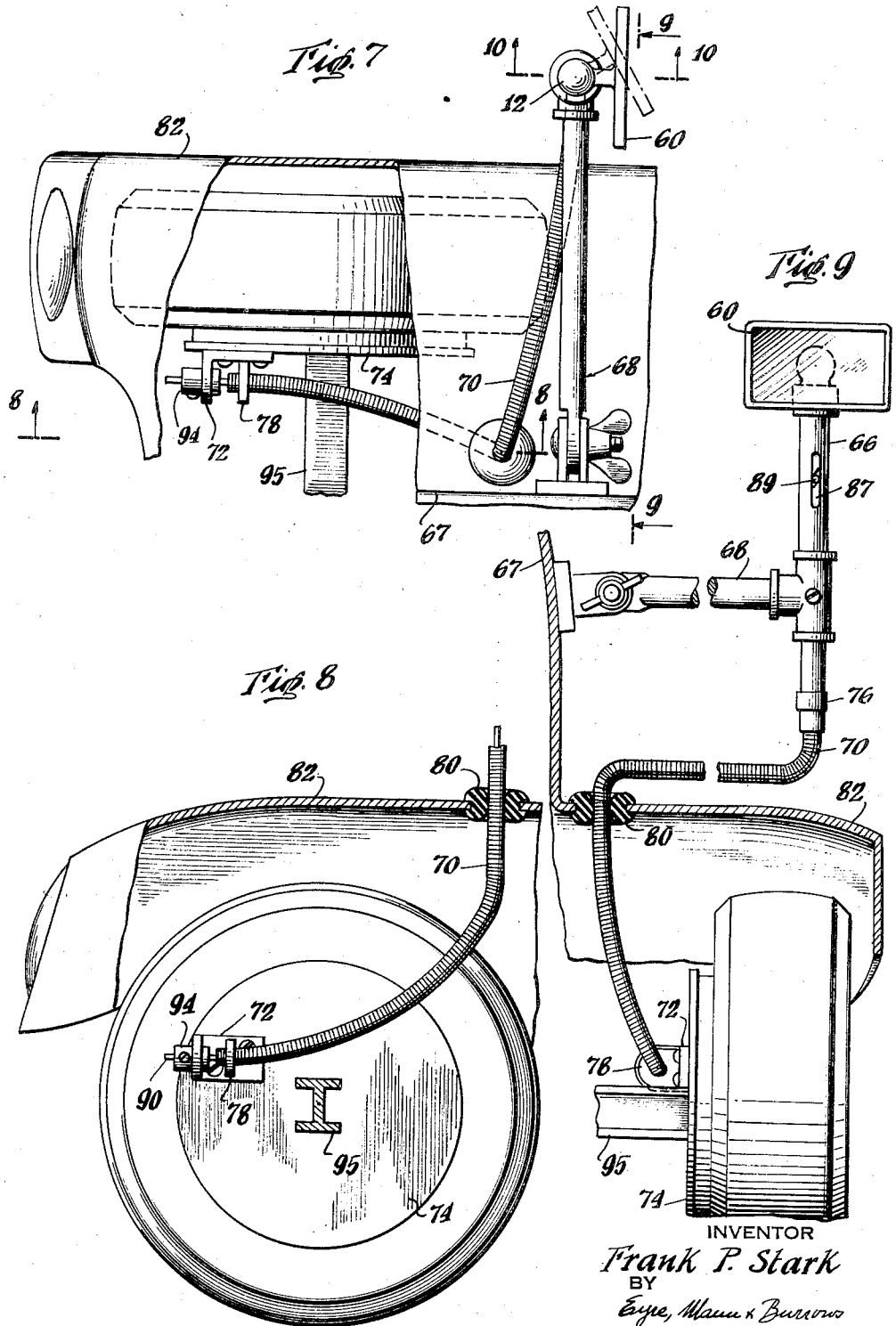

Oct. 7, 1958 F. P. STARK 2,854,892
REAR VIEW MIRROR FOR TRACTOR AND TRAILER
COMBINATION TYPE OF MOTOR TRUCK
Filed Sept. 26, 1955 4 Sheets-Sheet 4
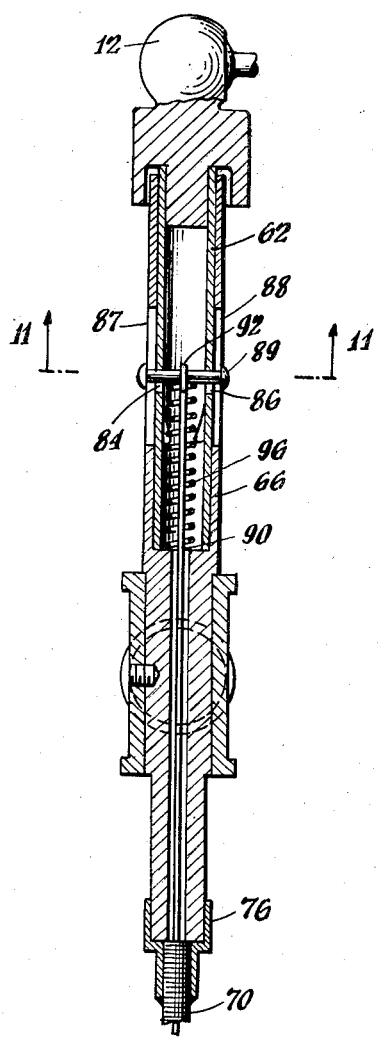
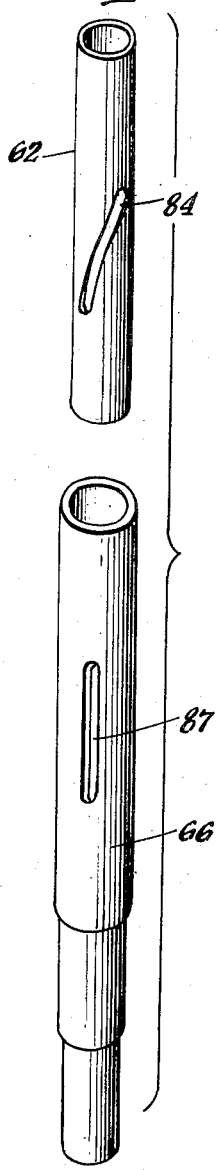
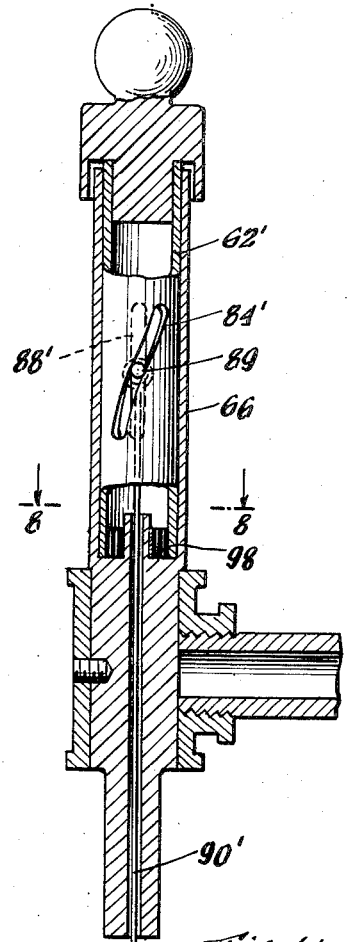
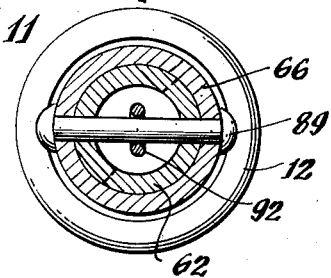
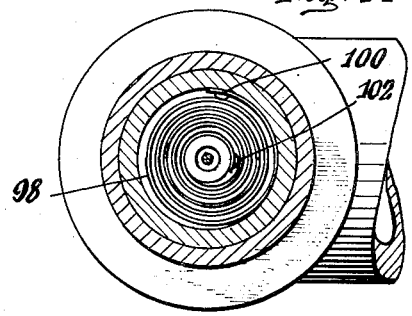
INVENTOR
Frank P. Stark
BY
Eyre, Mann & Burrows
ATTORNEYS

United States Patent Office 2,854,892
Patented Oct. 7, 1958

2,854,892

REAR VIEW MIRROR FOR TRACTOR AND TRAILER COMBINATION TYPE OF MOTOR TRUCK

Frank P. Stark, Long Island City, N. Y.

Application September 26, 1955, Serial No. 536,546

3 Claims. (Cl. 88—93)

This invention relates to a rear view mirror for use with a tractor and trailer combination type of motor truck.

In carrying out my invention I provide a rear view mirror which enables the driver of a tractor and trailer truck to see the rear of his vehicle when it turns to the right or left, or when the tractor is at an angle with the trailer as, for example, in backing up against a loading platform. The mirror is rotatively mounted on the tractor and mechanically connected with the steering mechanism so that it will turn as the steering wheel is turned. This compensates for the angle formed between the tractor and trailer and once the mirror is set on a designated spot relative to the trailer it continues to register there no matter how the truck is maneuvered. The driver may remain in position at the controls with full view of the rear of the trailer instead of leaning out of the window while he is maneuvering in congested areas which materially increases the safety of operation.

This invention may be readily understood by reference to the accompanying drawings which show an illustrative example of my invention.

Fig. 2 is a plan view of the mirror mounted on the left front mudguard driver's side with the mudguard cut away to show the mirror assembly.

Fig. 3 is a side view of the mirror taken on line 3—3 of Fig. 2.

Fig. 4 is taken on line 4—4 of Fig. 2.

Fig. 7 is a top view of another form of mounting means for my mirror mounted on the right front mudguard (passenger side) of a tractor for a tractor trailer truck.

Fig. 8 is a plan view of a portion of the structure of Fig. 7 taken on line 8—8 of Fig. 7.

Fig. 9 is a side view of the structure of Fig. 7 taken on line 9—9 of Fig. 7.

Fig. 10 is a detailed sectional view of my mirror mounting means taken on line 10—10 of Fig. 7.

Fig. 11 is a sectional view taken on line 11—11 of Fig. 10.

Fig. 12 is a plan view of the inner and outer hollow cylindrical mirror mounting tubes shown in Fig. 7 with the tubes separated to illustrate their construction, and Figs. 13 and 14 illustrate the use of a different type of spring in the structure of Fig. 7.

Figure 1:
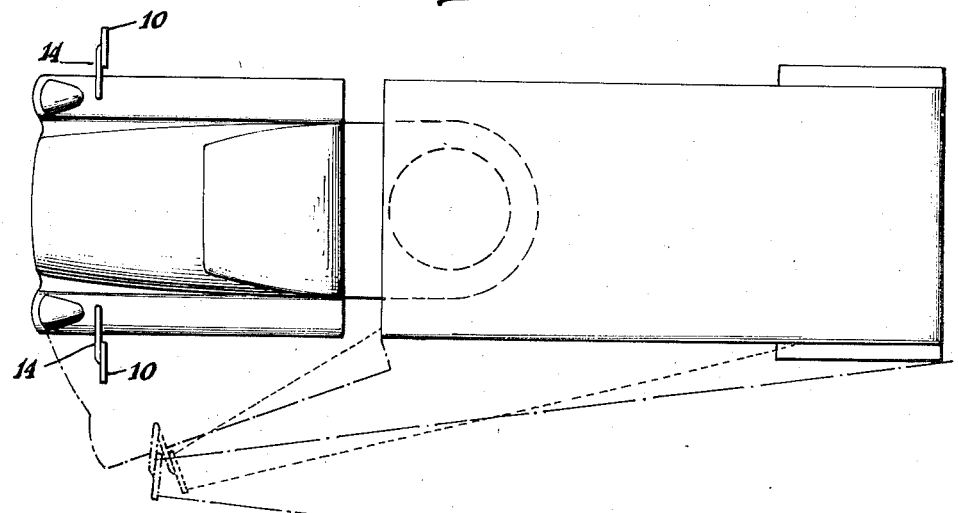
Fig. 1 is a schematic plan view of a tractor and trailer truck combination showing one form of my mirror mounted on the right and left mudguards of the tractor.

In the form of my invention shown in Fig. 1 mirror 10 is adjustably mounted by swivel bracket 12 at one end of a tube or shaft 14. Shaft 14 extends through the tractor mudguard 16 where it is rotatively supported in tube 18 by sleeve bearings 20. Set screws 22 hold tube 18 in circular flanges 24 and 26 which are bolted on mudguard 16. If desired a resilient member such as a rubber collar 28 may be interposed between flanges 24 and 26 and mudguard 16 to absorb vibrations between them.

Shaft 14 has a gear 30 at its lower end which is meshed with gear 32 carried at one end of plate 34. Plate 34 is rotatively mounted on circular flange 26 by means of bolt 36 and connected to bracket 38 of the front wheel brake housing 40 by means of slot 40 and rod 42. Rod 42 is adjustably mounted in slot 44 of bracket 38 by means of nuts 46 and is positioned so that the upper end of the rod is centered in slot 40 of plate 34 when the tractor wheels are set for travel on a straight road.

In operation the driver adjusts mirror 10 on swivel bracket 12 until it registers on a desired spot to the rear of the trailer. The mirror for the left front mudguard (driver's side) is illustrated in Figs. 2–4. As the tractor turns left, rod 42 rotates plate 34 into the dotted line position of Fig. 2 and this moves the face of mirror 10 away from the tractor into the position shown in dotted lines. This automatically compensates for the angle formed between the tractor and trailer so that mirror 10 continues to register on the designated spot relative to the rear of the trailer as shown in dot and dash lines of Fig. 1. It is to be noted however that the mirror shown in dotted lines of Fig. 1 illustrates an ordinary mirror which does not turn when the tractor turns. Referring again to Fig. 2 when the tractor is turned right, rod 42 rotates in the opposite direction and as a result mirror 10 again compensates for the angle formed between the tractor and trailer. The same mechanism may be used for the mirror on the right front mudguard.

If difficulty is experienced in positioning rod 42 under the tractor mudguard, the relationship of the parts above described may be changed. For example, rod 42 may be set in any position in slot 44, slot 40 may be positioned at an angle to the sides of plate 34 and if necessary rod 42 may be bent to achieve the correct turning movement in mirror 10 for the particular truck involved.

Figure 5:
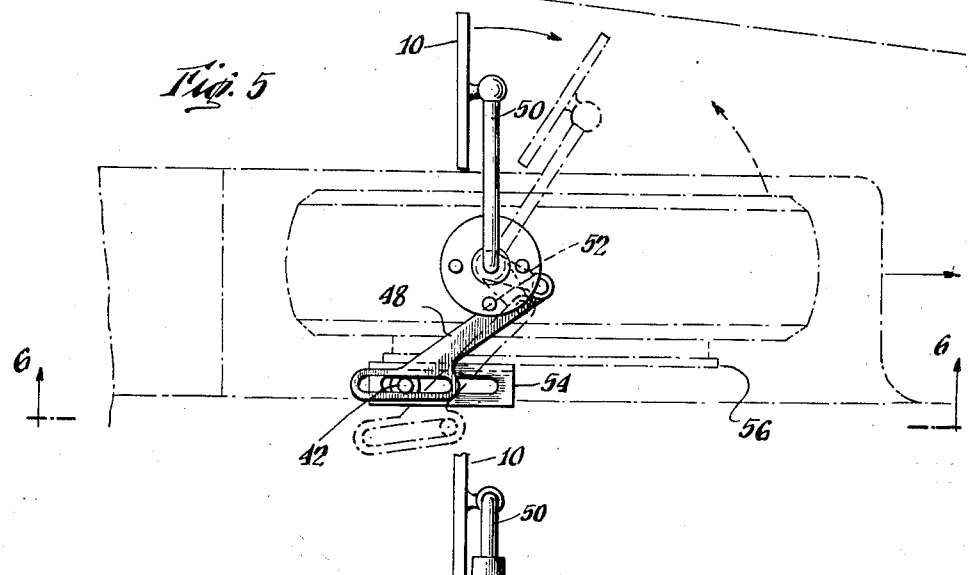
Fig. 5 shows a modified form of the mirror of Fig. 1 for the left front mudguard driver's side.
Figure 6:
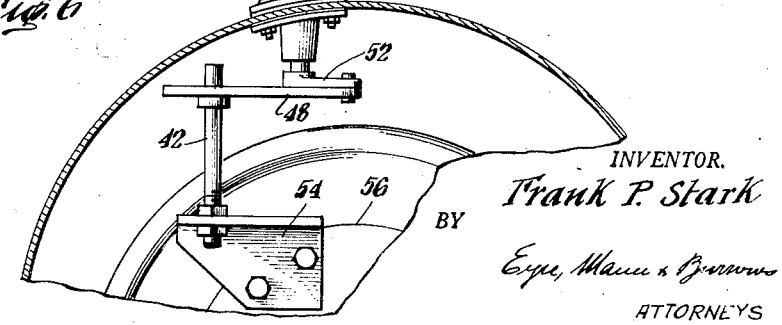
Fig. 6 is a side view of the mirror of Fig. 5 taken on line 6—6 of Fig. 5.

In the modified form of my invention shown in Figs. 5 and 6 plate 48 is connected to shaft 50 of mirror 10 by means of arm 52 in place of gears 30 and 32 described above and bracket 54 is located in a slightly different position on brake housing 56. The operation of this embodiment of my invention is the same as that previously described. As best shown in the dotted lines of Fig. 5 for the mirror on the left front mudguard (driver's side), when the tractor is turned left sideward movement of rod 42 is transmitted through plate 48 and arm 52 to shaft 50 which turns the face of mirror 10 away from the tractor so that it continues to register on the same spot relative to the rear of the trailer. When the tractor is turned right the movement of mirror 10 is reversed to achieve the same result.

Another form of my invention is shown in Figs. 7 through 14. As there shown, mirror 60 is mounted at the top of a hollow cylindrical tube 62 (Fig. 10) which is in turn rotatively mounted within an outer cylindrical casing 66. Casing 66 is mounted on the body 67 of the cab of the truck on the right-hand side (away from the driver's seat) by means of a suitable bracket 68. A flexible hollow tubing 70 connects the bottom of casing 66 to a bracket 72 on brake drum housing 74 of the right-hand front wheel of the truck. Flexible tube 70 is connected to the bottom of casing 66 and to bracket 72 by means of suitable clamps 76 and 78, respectively, and a boss 80 is provided for leading flexible tubing 70 through the right-hand front mudguard 82 of the truck. A slot 84 is cut through the wall at one side of inner tube 62 and the slot is so positioned that it crosses the line of the longitudinal axis through the tube at an angle so that it slants upwardly from the left to the right-hand side of tube 62, as best shown in Fig. 12. A second slot 86 (Fig. 10) is positioned in the wall of inner tube 62 directly opposite slot 84 and the opening of the second slot is arranged to correspond to the opening in slot 84. The outer cylindrical casing 66 carries a pair of slots 87 and 88 each of which is arranged substantially vertical along opposite sides of the wall of casing 66. Slots 87 and 88 are arranged so that the openings in the slots intersect the openings in slots 84 and 86 at about the middle thereof when tube 62 is positioned within casing 66. A pin 89 is slidably mounted in the slots and the end portions of pin 89 project out into the openings of slots 87 and 88. Pin 89 is connected with bracket 72 by means of a wire 90 which is positioned within the flexible tubing 70. Wire 90 is in turn connected to pin 89 and bracket 72 and this may be done by means of suitable clamps 92 and 94, respectively.

In order to adjust the assembly in this form of my invention, it is only necessary to set the mirror so that it registers at the desired spot at the rear of the trailer for travel on a straight road. The mirror is held in this position and wire 90 is then pulled up tight in clamp 94 so that there is no slack in the wire. In this connection it will be noted that the point at which wire 90 is connected to bracket 72 of brake drum housing 74 is positioned in front of the axle 95 for the wheel, and as a result when the tractor is turned to the right (Fig. 9) wire 90 is pulled out to the right and pin 89 is pulled down toward the bottom of casing 66. As the pin rides downwardly in the casing, it causes inner tube 62 to move in a counterclockwise direction which rotates the mirror in a counterclockwise direction outwardly away from the truck (Fig. 7). As a result of this rotation, mirror 60 continues to register at the designated spot on the rear of the truck when the truck is turned to the right. After the truck has made its right-hand turn, mirror 60 is returned to its initial starting position by means of spring 96 which is positioned between pin 89 and the bottom of casing 66 so that the spring is compressed when pin 89 is pulled downwardly in casing 66 as the truck turns to the right. When the front wheels of the truck are straightened, spring 96 expands and returns pin 89 to its initial starting position. It will be understood that mirror 60 rotates in the opposite direction to the direction of rotation of the front wheels of the truck. For a right-hand turn the front wheels of the truck may be considered to rotate in a clockwise direction (Fig. 7), while mirror 60 rotates out away from the truck in a counterclockwise direction. In the preferred form of my invention shown, the mirror will only continue to register on a designated spot at the rear of the truck during right-hand turns, and this is highly important for safety of operation, but it will also be obvious to those skilled in the art that if desired the assembly shown may be readily adapted to cause mirror 60 to continue to register on a designated spot during left-hand turns. This may be done in one of two ways.

One way is to so arrange spring 96 that the spring is compressed and under tension when pin 89 is positioned near the center of the slots for travel on a straight road. This arrangement is shown in Fig. 13 for the right-hand side of the truck. As there shown, the assembly is exactly the same as that shown in Figs. 7 through 12, with the exception that spring 96 has been replaced with a flat coiled spring 98 (like that used for the main spring of a watch only spring 98 is much stronger) which is attached at one end to casing 66 as at 100 and at the other end to inner tube 62 as at 102. For travel on a straight road wire 90' is pulled up in the clamp on the front wheel brake housing (not shown) until pin 89 is positioned approximately in the center of slots 84' and 88' which places spring 98 under tension and then when the truck wheels are turned to the left wire 90 becomes loose and spring 98 is free to rotate inner tube 62' in a clockwise direction in towards the body of the truck and mirror 60 is also rotated in a clockwise direction in towards the body of the trailer so that the mirror continues to register at a designated spot at the rear of the trailer. When the wheels are straightened out, pin 89 is pulled down and mirror 60' is rotated in a counterclockwise direction back into its starting position for travel on a straight road. For a right-hand turn mirror 60' will function the same way that mirror 60 functions as described hereinbefore above. Elements designated by the numerals 60', 62', etc., are exactly the same as the corresponding elements designated by 60, 62, etc. in Figs. 7 through 12. The other way in which the same result can be accomplished is to employ a relatively stiff but flexible cable, such as the ordinary choke wire, which will pull down and push up on pin 89, depending upon the direction that the front wheels are turned away from their normal position for travel on a straight road. If such a choke cable is used it is best to include a spring, such as spring 96 in the assembly, to assist in moving pin 89 in the slots of inner tube 62.

Although I have described the form of my invention shown in Figs. 7 through 14 for the right-hand front mudguard (passenger side) of a tractor, it will be obvious to those skilled in the art that the same mechanism may be used on the left-hand driver's side of the tractor by merely reversing the slots in inner tube 62. That is when the structure of Fig. 7 is mounted on the left-hand front mudguard slot 84 has to be so arranged that it slants upwardly from the right to the left-hand side of the inner tube upon which the mirror is mounted as distinguished from the structure of Fig. 7 in which slot 84 slants upwardly from the left to the right-hand side of inner tube 62.

This application is a continuation-in-part of my copending application Serial No. 302,671, filed August 5, 1952, now abandoned.

What is claimed is:

1. A rear view mirror for a tractor trailer truck combination, a hollow tube, means for rotatively mounting said hollow tube within a cylindrical casing, a slot in the wall of said hollow tube positioned at an angle with the line of the longitudinal axis through the tube, a second slot arranged substantially vertical in the wall of the cylindrical casing with the opening of said second slot located in a line which crosses the opening of the slot in said hollow tube, a pin within the hollow tube having its end portion slidably mounted in said slots, means for connecting said pin with a front wheel of the tractor, said means being adapted to move said pin along the longitudinal axis of the hollow tube when the tractor wheel is turned, spring means for returning the said pin to its starting position when the tractor wheel is returned to its starting position, and means for mounting the mirror at the top of said hollow tube whereby the mirror will continue to register at a designated spot at the rear of the trailer once it is set there, regardless of how the truck is maneuvered.

2. A rear view mirror for a tractor trailer truck combination, means for mounting the mirror on top of a hollow tube, means for rotatively mounting said tube within a cylindrical casing, a slot in the wall of said hollow tube positioned at an angle with the longitudinal axis through the tube, a slot positioned in the wall of said cylindrical casing with the opening in the slot of the cylindrical casing being arranged to cross the opening of the slot in the hollow tube, a pin slidably mounted in said slots, means connecting said pin with the right-hand front wheel of the tractor, said means being adapted to pull downwardly on the pin when the tractor wheel is turned, spring means for returning said pin to its starting position when the tractor wheels are straightened for travel on a straight road whereby the mirror will rotate in a direction opposite to that in which the truck turns so that the mirror continues to register on a designated spot at the rear of the trailer once it is set there while the truck makes its turn.

3. A rear view mirror for a tractor trailer truck combination comprising a tube rotatably mounted within a cylindrical casing, a slot in said tube, a second slot in the wall of said cylindrical casing, the opening of said second slot being arranged to cross the opening of the slot in the tube, a pin slidably mounted in said slots, means for connecting the pin with a front wheel of the tractor, said means being adapted to slide the pin in said slots when the front wheels of the tractor are turned whereby the tube is made to rotate within said casing, and a mirror mounted in the top of said tube whereby the mirror will continue to register on the rear of the trailer, regardless of how the truck is maneuvered.

References Cited in the file of this patent

UNITED STATES PATENTS

| | | |
|---|---|---|
| 1,198,855 | Krumbein | Sept. 19, 1916 |
| 1,250,277 | Bryant | Dec. 18, 1917 |
| 1,404,281 | Duffy | Jan. 24, 1922 |
| 1,866,324 | Russo | July 5, 1932 |
| 1,952,346 | Wettstein | Mar. 27, 1934 |
| 2,250,734 | Thompson et al. | July 29, 1941 |
| 2,585,399 | Mead | Feb. 12, 1952 |
| 2,704,963 | Parachek | Mar. 29, 1955 |